United States Patent
Wee et al.

(10) Patent No.: US 9,514,392 B2
(45) Date of Patent: Dec. 6, 2016

(54) METHOD OF CREATING COMPOUND FILE AND DATA STORAGE DEVICE HAVING THE COMPOUND FILE

(71) Applicant: Samsung Electronics Co., Ltd., Suwon-si, Gyeonggi-do (KR)

(72) Inventors: Young-Cheul Wee, Suwon-si (KR); Young-Hoon Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 14/186,736

(22) Filed: Feb. 21, 2014

(65) Prior Publication Data
US 2014/0241647 A1    Aug. 28, 2014

(30) Foreign Application Priority Data
Feb. 25, 2013    (KR) .................. 10-2013-0019569

(51) Int. Cl.
*G06K 9/54* (2006.01)
*G06K 9/80* (2006.01)
*H04N 1/32* (2006.01)

(52) U.S. Cl.
CPC ............ *G06K 9/80* (2013.01); *H04N 1/32101* (2013.01); *H04N 1/32128* (2013.01)

(58) Field of Classification Search
CPC .................. G06K 9/80; G06K 15/02; G06K 2215/0008; G06K 2215/0065; G06K 2215/0082; H04N 1/00204; H04N 1/00307; H04N 1/2179; H04N 1/2191; H04N 1/32112; H04N 1/32128; H04N 1/32101; H04N 5/85; H04N 9/4443; H04N 9/8042; H04N 11/1451; H04N 11/1469; H04N 17/30; H04N 17/30067; H04N 17/30265; H04N 17/3028; H04N 17/30716; H04N 17/30899; H04N 19/46; H04N 19/60; H04N 19/70; H04N 21/4223; H04N 21/4355; H04N 21/4402; H04N 21/84; H04N 21/845; H04N 21/85406; H04N 2101/00; H04N 2201/0067; H04N 2201/0068; H04N 2201/0084; H04N 2201/3264; H04N 2201/3226; H04N 2201/3249; H04N 2201/325; H04N 2201/3267; H04N 2203/0697; G06T 1/00; Y10S 707/99931; Y10S 707/99942; G11B 19/025; G11B 27/002; G11B 27/034; G11B 27/105; G11B 27/11; G11B 27/326; G11B 27/329; G11B 27/34; G11B 27/36; G11B 2220/213; G11B 2220/216; G11B 2220/218; G11B 2220/2525; G11B 2220/2545; G11B 2220/2562; G11B 2220/2565; G11B 2220/2575
See application file for complete search history.

(56) References Cited

U.S. PATENT DOCUMENTS 6,268,927 B1 *  7/2001  Lo et al. .............. 358/1.15
6,915,012 B2 *  7/2005  Osborne et al. ........ 382/232

(Continued)

FOREIGN PATENT DOCUMENTS

EP    1 351 187 A2    10/2003
EP    2 276 230 A2    1/2011

(Continued)

*Primary Examiner* — Jose Couso
(74) *Attorney, Agent, or Firm* — Jefferson IP Law, LLP (57) ABSTRACT

A method for creating a compound file where additional data is inserted into an image file and a data storage device having the compound file recorded therein is provided. The method includes receiving, by a compound file creating apparatus, the image file and the additional data, and creating, by the compound file creating apparatus, the compound file by using the received image file and the additional data, wherein the compound file comprises an image file header corresponding to the image file, image data corresponding to the image file, and a marker recorded in a tail of the compound file and indicating that the compound file is an image file having the additional data inserted therein.

16 Claims, 8 Drawing Sheets

(56) References Cited

U.S. PATENT DOCUMENTS

| | | | |
|---|---|---|---|
| 6,993,196 B2 * | 1/2006 | Sun et al. | 382/233 |
| 7,082,567 B1 | 7/2006 | Young et al. | |
| 8,340,440 B2 * | 12/2012 | Lee et al. | 382/232 |
| 8,639,665 B2 * | 1/2014 | Berman et al. | 707/651 |
| 2003/0174893 A1 | 9/2003 | Sun et al. | |
| 2005/0147390 A1 * | 7/2005 | Nakamura et al. | 386/95 |
| 2006/0026376 A1 * | 2/2006 | LaChapelle et al. | 711/170 |
| 2006/0114514 A1 * | 6/2006 | Rothschild | 358/3.28 |
| 2006/0126950 A1 | 6/2006 | Ahn et al. | |
| 2006/0132620 A1 * | 6/2006 | Takada et al. | 348/231.3 |
| 2007/0292035 A1 | 12/2007 | Lee et al. | |

FOREIGN PATENT DOCUMENTS

| | | |
|---|---|---|
| JP | 2003-174621 A | 6/2003 |
| KR | 10-2001-0009550 A | 2/2001 |
| KR | 10-2001-0098947 A | 11/2001 |
| KR | 10-2006-0066913 A | 6/2006 |
| KR | 10-2007-0023188 A | 2/2007 |
| KR | 10-2010-0112704 A | 10/2010 |

* cited by examiner

METHOD OF CREATING COMPOUND FILE AND DATA STORAGE DEVICE HAVING THE COMPOUND FILE

CROSS-REFERENCE TO RELATED APPLICATION(S)

This application claims the benefit under 35 U.S.C. §119 (a) of a Korean patent application filed on Feb. 25, 2013 in the Korean Intellectual Property Office and assigned Serial number 10-2013-0019569, the entire disclosure of which is hereby incorporated by reference.

TECHNICAL FIELD

The present disclosure relates to a method for creating a compound file and a data storage device having the compound file recorded therein. More particularly, the present disclosure relates to a data storage device capable of rapidly confirming whether an image file is a compound file by positioning information, for example, a marker, in a tail of the compound file.

BACKGROUND

According to the related art, various application services may be enabled by inserting additional data into an image file.

As example of the related art, the following two patents are discussed below: U.S. Pat. No. 6,993,196 "Digital image storage method" (hereinafter referred to as related art 1) and U.S. Pat. No. 8,340,440 "Apparatus and method for inserting additional data into image file in electronic device" (hereinafter referred to as related art 2).

In the specification, for convenience of explanation, an image file having additional data inserted therein is referred to as a compound file.

In such a way, once the compound file is created, various application services may be enabled when the image file is played. For example, when the additional data is sound source data, a sound collected while the corresponding image file is captured or a sound harmonizing with the image file may be provided while the image file is played. Alternatively, various pieces of information or information obtaining sites (for example, a Uniform Resource Locator (URL) link) relative to the image file may be provided.

On the other hand, in order to widely use a compound file, it becomes an important issue to rapidly determine whether a specific image file is a file having image data (e.g., an image file, a compound file having additional data, and the like) inserted therein. Furthermore, even when it is determined as a compound file, it may become an important issue to rapidly access additional data by a data processing device which processes the image file. In addition, wide usability of the compound file or compatibility between applications can be ensured by allowing the additional data to be easily inserted or removed.

However, the related art 1 discloses a method for confirming whether an image file is a compound file. For this, an End of Image (EOI) is compared with an End of File (EOF), and, when the EOF is larger than the EOI, (i.e., some data is further included behind image data), the image file is determined as the compound file. However, although the data processing device handling the image file can rapidly access the EOF, it takes a lot of time and work to determine the EOI. For example, according to a type of image file, there is a case where information for a location of the EOI exists in a header, but there is also a case where information for the location of the EOI does not exist in the header. In addition, although the header has the EOI information, a process is needed to search at least the header of the image file for information on the EOI. Accordingly, a lot of time and accesses are needed for determining whether the image file is a compound file, and accordingly a lot of time is to be taken to access the additional data by the data processing device.

Moreover, the related art 2 discloses that information for presence or absence of additional data is recorded in a header. This method is illustrated in FIG. 1.

Figure 1:
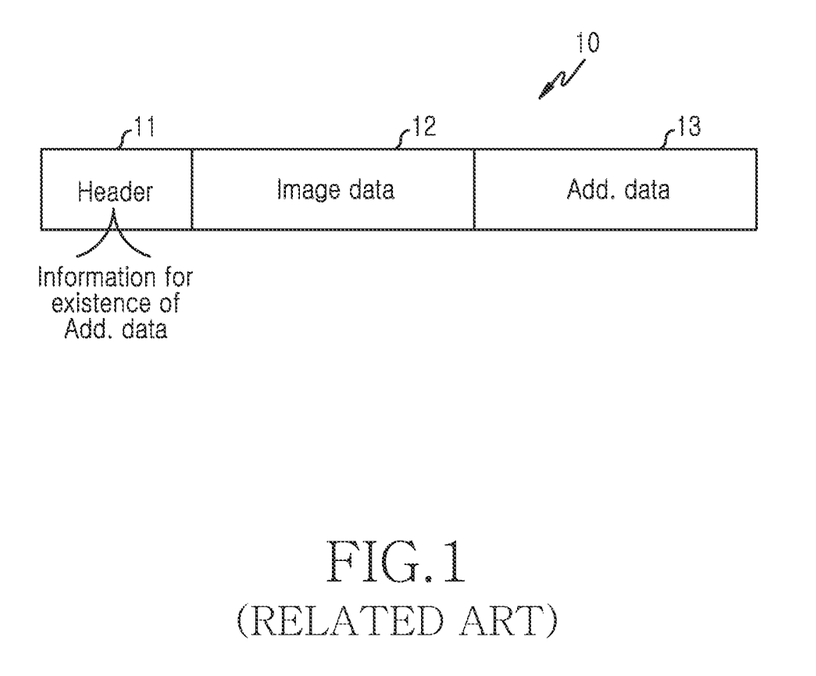
FIG. 1 illustrates a schematic structure of a compound file format according to the related art.

FIG. 1 illustrates a schematic structure of a compound file according to the related art.

Referring to FIG. 1, a compound file 10 includes an image file and additional data 13 which is inserted into the image file. The image file includes a header 11 and image data 12. As illustrated in FIG. 1, the header 11 has important information recorded therein for handling the image file, such as a type of the image file, and information related to encoding and decoding. In addition, in the related art 2, the header 11 has information for presence of the additional data or a location of the additional data recorded therein. Accordingly, even in the related art 2, a long time may be taken to sequentially search the header 11 in order to confirm whether the image file is a compound file, that is, a longer time to be taken as a size of the header 11 becomes larger. Furthermore, when the presence of the additional data or an item related to the additional data is recorded in the header 11, there is a risk for losing information for the additional data when an event (e.g., re-encoding, resizing, changing of the image file, and the like) by which header information may be changed occurs, while the image file is handled by a data processing device. Moreover, in order to prevent this type of risk, the information on the additional data needs to be separately managed in occurrence of the event, which causes problems in wide usability or compatibility for various applications which handle corresponding compound files. In addition, there may also be a limitation of changing the header 11 when the additional data is further inserted or removed.

Therefore, a need exists for a compound file format, a compound file creating method, and a data storage device capable of rapidly confirming whether an image file is a compound file, rapidly accessing the additional data, and easily performing insertion or removal of the additional data.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a compound file, a compound file creating method, and a data storage device capable of rapidly confirming whether an image file is a compound file by positioning information, for example, a marker, in a tail of the compound file.

Another aspect of the present disclosure is to provide a compound file, a compound file creating method, and a data storage device for allowing a rapid access to additional data by recoding a reference, which represents a location of the additional data, in a certain location around the marker.

Another aspect of the present disclosure is to provide a compound file, a compound file creating method, and a data storage device enabling easy insertion or removal of additional data into or from the compound file and allowing a header not to be changed in this case to increase usability.

In accordance with an aspect of the present disclosure, a method for creating a compound file where additional data is inserted into an image file is provided. The method includes receiving, by a compound file creating apparatus, the image file and the additional data, and creating, by the compound file creating apparatus, the compound file by using the received image file and the additional data, wherein the compound file includes an image file header corresponding to the image file, image data corresponding to the image file, and a marker recorded in a tail of the compound file and indicating that the compound file is an image file having the additional data inserted therein.

The compound file may further include at least one reference positioned around the marker and indicating a position of the additional data, and the additional data positioned behind the image data.

The marker may include a pattern in plural.

The reference may have a constant size and be recorded at a position adjacent to the marker.

The method may further include inserting, by the compound file creating apparatus, second additional data into the compound file, wherein the compound file having the second additional data inserted therein may further include a second marker positioned at the tail of the compound file having the second additional data inserted therein, a second reference positioned around the second marker and indicating a position of the second additional data, and the second data positioned behind the marker.

The method may further include inserting, by the compound file creating apparatus, second additional data into the compound file, wherein the compound file having the second additional data inserted therein may further include a second reference positioned around the reference and indicating a position of the second additional data, and the second additional data positioned behind the additional data.

In accordance with another aspect of the present disclosure, a non-transitory computer readable medium having a program recorded thereon is provided, which, when executed by a computer, performs the method of any one of the above-described.

In accordance with another aspect of the present disclosure, a data storage device for storing a compound file where additional data is inserted into an image file is provided. The data storage device includes an image file header corresponding to the image file, an image data corresponding to the image file, and a marker recorded in a tail of the compound file and indicating that the compound file is an image file having the additional data inserted therein.

The compound file may further include at least one reference positioned around the marker and indicating a position of the additional data, and the additional data positioned behind the image data of the image file.

The compound file may further include second additional data, wherein the compound file having the second additional data inserted therein may further include a second marker positioned in the tail of the compound file having the second additional data inserted therein, a second reference positioned around the second marker and indicating a position of the second additional data, and the second additional data positioned behind the marker.

The compound file may further include second additional data, wherein the compound file having the second additional data inserted therein may further include a second reference positioned around the reference and indicating a position of the second additional data, and the second additional data positioned behind the additional data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an" and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof It will be understood that when an element transmits data to another element, it can directly transmit to the other element or at least one intervening element may be present. In contrast, when an element "directly transmits" data to another element, there are no intervening elements present.

The present disclosure relates to, when additional data is inserted into an image file, a method and device capable of rapidly accessing the additional data by positioning information in a tail of the image file, where the information is a marker representing that the image file is a file having the additional data inserted therein, and capable of easily inserting or removing the additional data.

Hereinafter, the present disclosure will be described with reference to the attached drawings. Like reference numerals in the drawings denote like elements.

Figure 2:
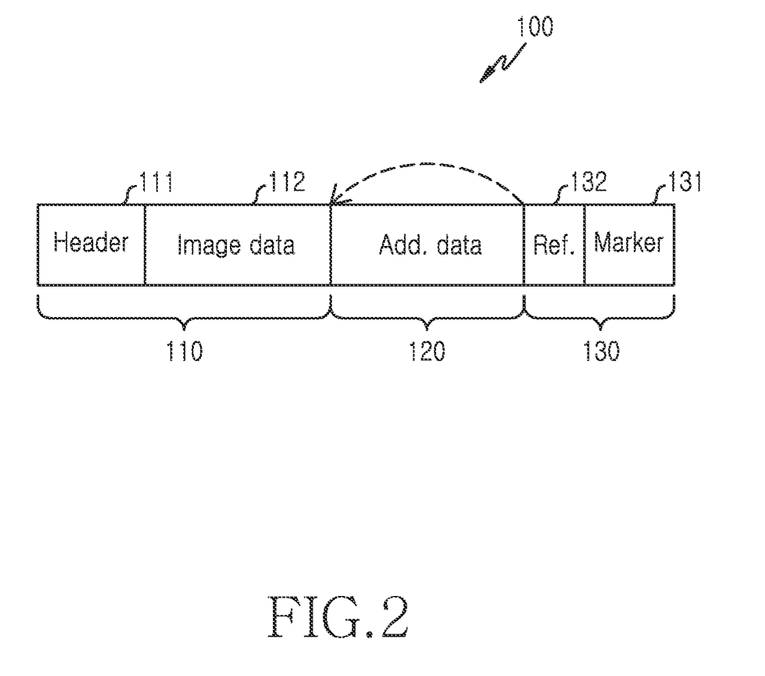
FIG. 2 illustrates a format of a compound file according to an embodiment of the present disclosure.

FIG. 2 illustrates a format of a compound file according to an embodiment of the present disclosure.

Referring to FIG. 2, a compound file 100 according to an embodiment of the present disclosure may include an image area 110 corresponding to an image file and additional data 120. The compound file 100 may be generated by adding the additional data 120 to an original image file according to an embodiment of the present disclosure. The image area 110 may include a header 111 and image data 112. The header 111 has information (e.g., an image type, an image length, a creation time, and the like) related to the image data 112 recorded therein. The image data 112 may be an image encoded and recorded therein.

The additional data 120 may be realized in any type of data (e.g., a sound, a text, a link, an executable file, and the like). The additional data 120 may be properly selected according to a service provided to a user and inserted into the original image area 110.

According to an embodiment of the present disclosure, the compound file 100 includes a marker 131 positioned in a tail of the compound file 100. For example, a header of a certain file includes information related to data included in the file. However, according to an embodiment of the present disclosure, the compound file 100 includes the marker 131 in the tail thereof.

The marker 131 may be information representing that the compound file 100 is an image file having the additional data 120 inserted therein. The marker 131 may be information selected from among patterns (e.g., "1111") having low probability to appear as the image data 112. According to a realization example, the marker 131 may be information that the pattern is repeated in plural. Since the pattern has low probability to exist in the image data 112, the marker 131 that the pattern is repeated in plural may be sufficiently used as an identifier which represents that the compound file 100 is an image file having the additional data inserted therein.

In such a way, since the marker 131 is positioned in the tail of the compound file 100 and when an image file is received, an apparatus or a system (e.g., an image decoder, and the like) handling the compound file 100 rapidly confirms whether the image file is the compound file 100 by confirming whether the marker is positioned in the tail. The marker 131 has a certain size and may further include information related to the additional data 120 besides the identification information representing that the image file is the compound file 100.

Furthermore, a reference 132 may be positioned in a certain position around the marker 131 in the compound file 100. A position around the marker 131 is enough as the certain position. According to an embodiment, the reference 132 may be adjacent to the marker 131 and recorded ahead of the marker 131. The reference 132 may indicate a position of the additional data 120.

Accordingly, the apparatus for handling the compound file 100 may rapidly confirm that the compound file 100 is the image file having the additional data 120 inserted therein by confirming the tail of the compound file 100. In addition, since the reference 132 is positioned around the marker 131, the position of the additional data 120 may be confirmed just by confirming the reference 132 again when the image file is determined as the compound file 100 after the marker 131 is confirmed. The position of the additional data 120 may be a start position of a header having metadata information for the additional data 120 recorded therein, when the additional data 120 includes a header.

Accordingly, it may be rapidly confirmed whether a current file is the compound file 100, and even the position of the additional data 120 may be very rapidly confirmed. Moreover, according to an embodiment of the present disclosure, since information related to the additional data 120 is not included in the header 111, it is not required to change the header 111 in insertion or deletion of the additional data 120. Accordingly, the insertion (or additional insertion) or deletion of the additional data 120 may be easily performed as long as the format of the compound file 100 is maintained.

Furthermore, since the header 111 is not changed according to the insertion or deletion of the additional data 120, the insertion or deletion of the additional data 120 is enabled in the same manner regardless of a kind or a format of the image file so that extensibility or compatibility for each application is high.

For convenience of explanation, the marker 131 and the reference 132 will be referred to as additional data management information 130.

Figure 3:
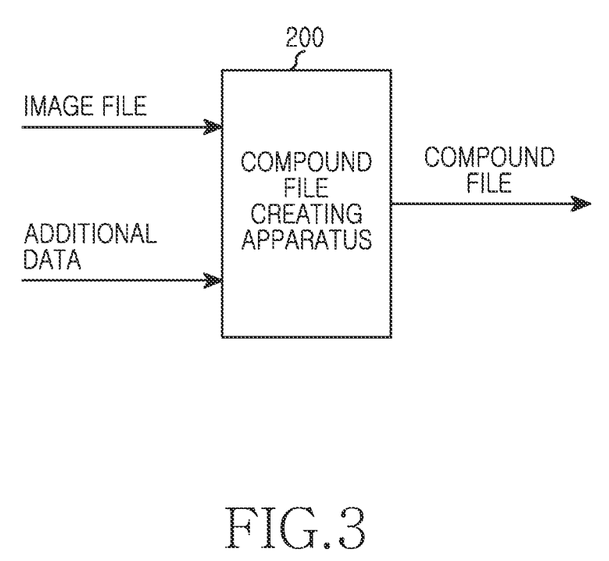
FIG. 3 illustrates a compound file creating apparatus according to an embodiment of the present disclosure.

A compound file creating apparatus according to an embodiment of the present disclosure is schematically illustrated in FIG. 3.

Figure 5:
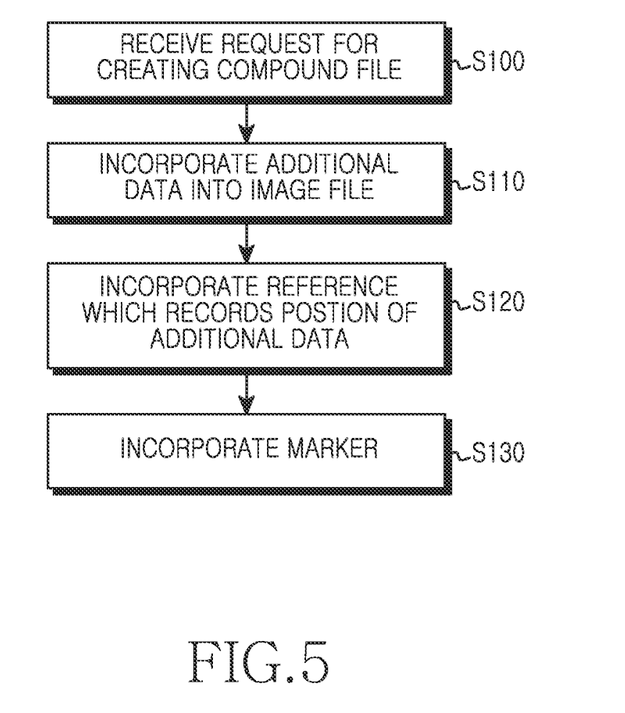
FIG. 5 is a flowchart schematically illustrating a compound file creating method according to an embodiment of the present disclosure.

FIG. 3 illustrates a compound file creating apparatus according to an embodiment of the present disclosure. FIG. 5 is a flowchart schematically illustrating a compound file creating method according to an embodiment of the present disclosure.

Referring to FIGS. 3 and 5, a compound file creating apparatus 200 may create a compound file according to an embodiment of the present disclosure.

The compound file creating apparatus 200 refers to an image file encoder installed in a data processing device (e.g., a computer, a mobile phone, and the like). The compound file 100 may receive an image file and additional data to be inserted into the image file. Furthermore, a request for creating the compound file may be received from a user at operation S100. Alternatively, when the image file and the additional data are input, a process may be automatically performed to create the compound file.

Thereafter, the compound file creating apparatus 200 may incorporate the additional data into the image file at operation S110. In addition, the compound file creating apparatus 200 may incorporate a reference in which a position of the additional data is recorded into result data that the additional data is incorporated at operation S 120. Furthermore, the compound file creating apparatus 200 may incorporate a marker into result data that the reference is incorporated at operation S130.

The compound file creating apparatus 200 does not have to always follow a sequence illustrated in FIG. 5 to create the compound file 100. For example, when sizes of the additional data 120, the reference 132 and the marker 131 are pre-determined, the compound file creating apparatus 200 may first confirm each size and creates files used by the compound file 100, and records the additional data 120, the reference 132, and the marker 131 at respective positions in an arbitrary sequence.

Figure 4:
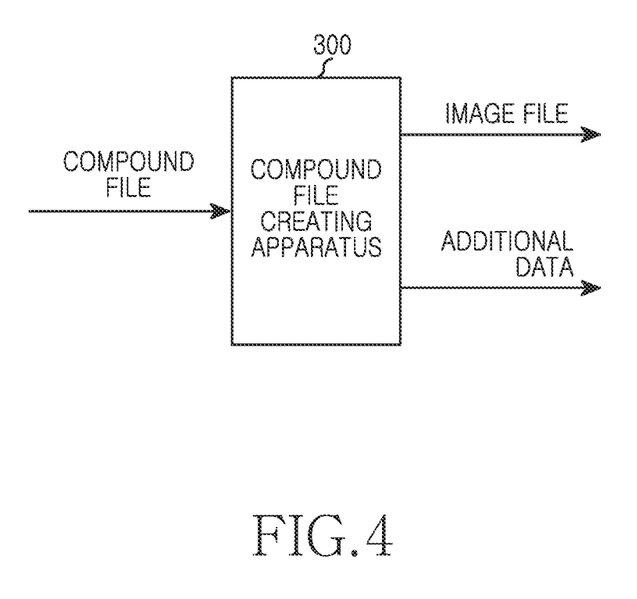
FIG. 4 illustrates a compound file decoding apparatus according to an embodiment of the present disclosure.
Figure 6:
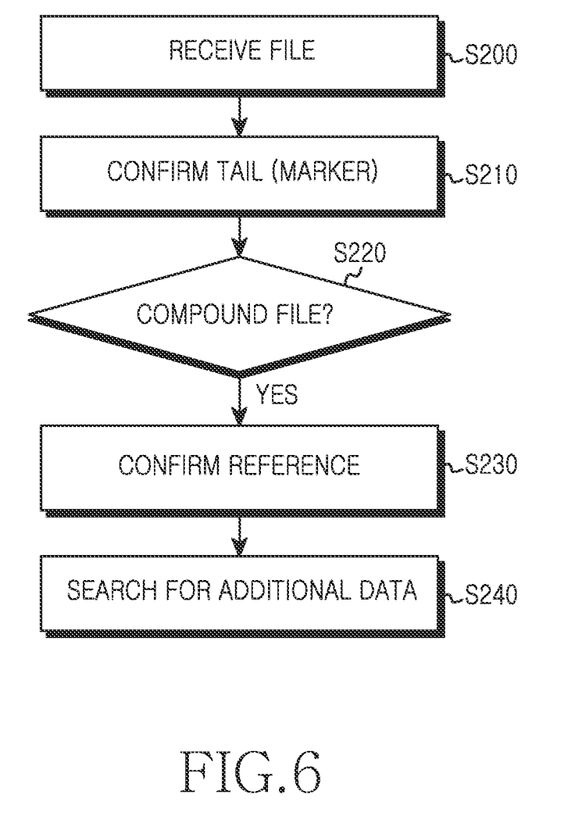
FIG. 6 is a flowchart schematically illustrating a method for accessing a compound file according to an embodiment of the present disclosure.

On the other hand, examples of a compound file decoding apparatus and a compound file decoding method for using the compound file 100 according to an embodiment of the present disclosure are illustrated in FIGS. 4 and 6.

FIG. 4 illustrates a compound decoding apparatus according to an embodiment of the present disclosure. FIG. 6 is a flowchart schematically illustrating a method for accessing a compound file according to an embodiment of the present disclosure.

Referring to FIGS. 4 and 6, in order to decode the compound file 100 according to an embodiment of the present disclosure and use the decoded compound file, a compound file decoding apparatus 300 may be prepared. The compound file decoding apparatus 300 refers to an image file decoder installed in a data processing device (e.g., a computer, a mobile phone, and the like).

The compound file decoding apparatus 300 may receive a file at operation S200. Thereafter, the compound file decoding apparatus 300 may confirm a tail of the received file, namely, a marker at operation S210. When the marker defined according to an embodiment of the present disclosure is present in the tail of the received file (i.e., when bits of a certain size from the end of file are the same as the marker), the compound file decoding apparatus 300 may confirm that the file is the compound file 100 at operation S220.

Thereafter, the compound file decoding apparatus 300 may confirm the reference 132 to specify the additional data 120 in the compound file 100 at operation S230. The reference 132 may exist at a certain position (e.g., several bits rightly ahead of the marker) around the marker 131. The additional data 120 may be searched based on the confirmed reference 132 at operation S240. In such a way, when a position of the additional data 120 is specified, the compound file decoding apparatus 300 may decode image data 112 positioned ahead of the additional data 120. At this time, it is natural that the header 111 may be referenced.

Furthermore, the specified additional data 120 may be executed according to a type of the additional data 120. When the additional data 120 is image data, an image may be decoded and displayed. When the additional data 120 is sound data, a sound may be played. Alternatively, when the additional data 120 is an executable file, the file may be executed. When the additional data 120 is a Uniform Resource Locator (URL) link, a web client may be connected to the URL.

On the other hand, the compound file according to an embodiment of the present disclosure may be an image file having a plurality of data items inserted therein. This example is described in FIGS. 7 and 8.

Figure 7:
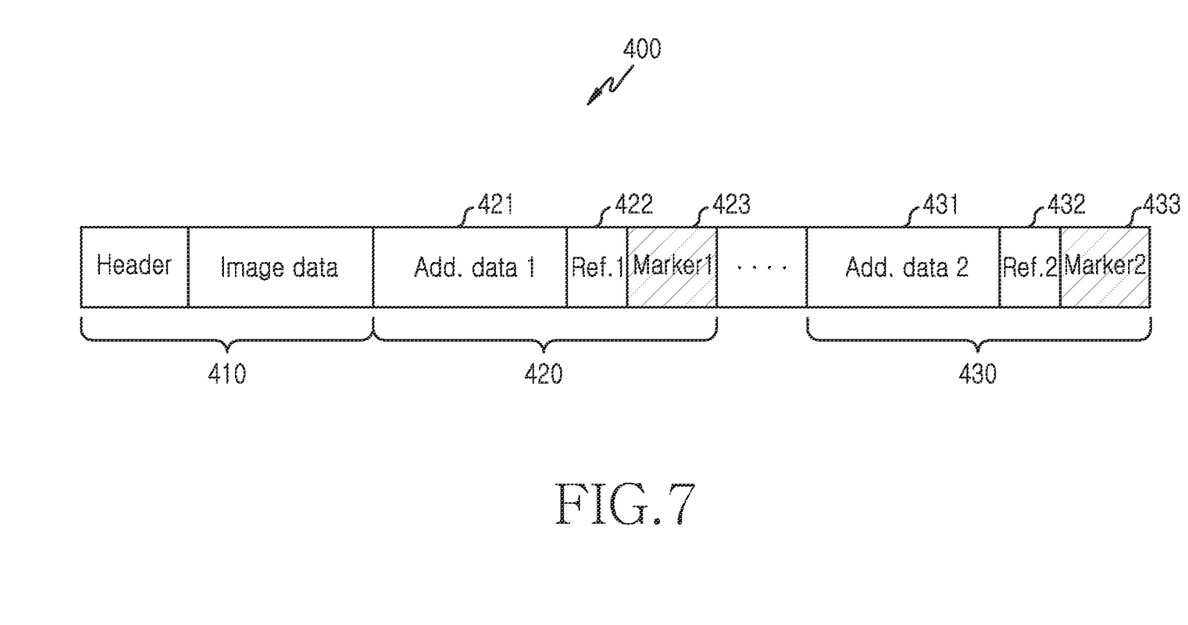
FIG. 7 illustrates a format of a compound file having a plurality of additional pieces of data inserted therein according to an embodiment of the present disclosure.
Figure 8:
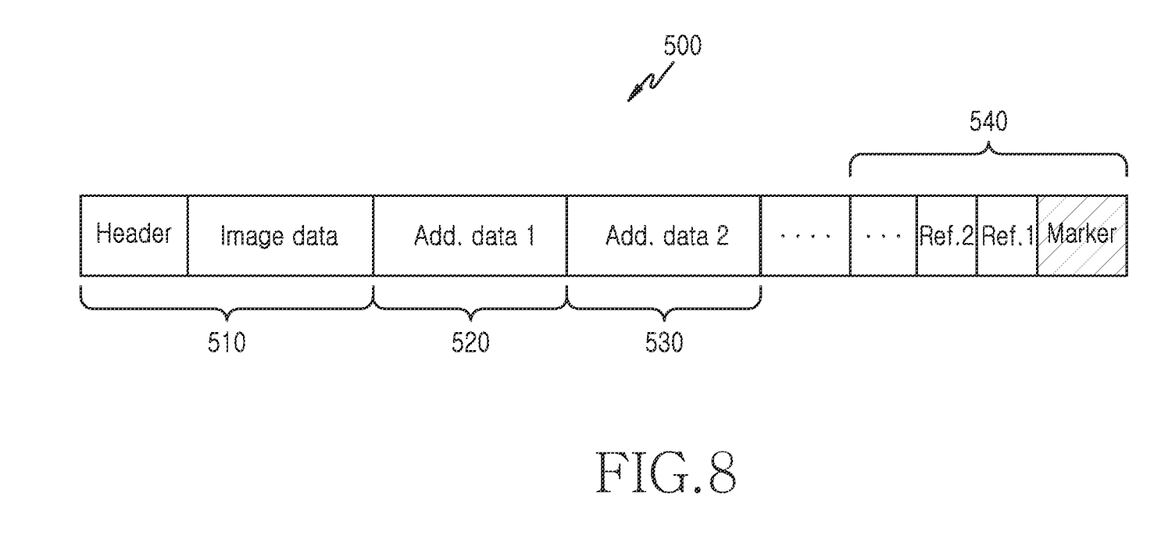
FIG. 8 illustrates a format of a compound file having a plurality of additional pieces of data inserted therein according to an embodiment of the present disclosure.

FIG. 7 illustrates a format of a compound file having a plurality of additional data items inserted therein according to an embodiment of the present disclosure. FIG. 8 illustrates a format of a compound file having a plurality of additional data items inserted therein according to an embodiment of the present disclosure.

FIGS. 7 and 8 illustrate cases where two additional data items (e.g., Add. data 1 and Add. data 2) are inserted into an image file, and a similar method may be applied when several additional data items are inserted or removed.

FIG. 7 represents an embodiment that additional data management information (i.e., markers and references) exists in a compound file 400 when first addition data 421 and second additional data 431 are inserted into the compound file 400, and the additional data and the additional data management information may be inserted or removed in a set type.

Referring to FIG. 7, the compound file 400 may include an image region 410 and additional data regions 420 and 430. When the first additional data 421 is inserted into an original image file corresponding to the image region 410 of the compound file 400, the first additional data 421 may be inserted in a scheme described in relation to FIGS. 3 and 5. Thereafter, the compound file 400 may have the image region 410 and the first additional data region 420. The tail of the file may include a first marker 423 for the first additional data 421 and a first reference 422 representing a position of the first additional data 421.

Thereafter, when the second additional data 431 is inserted, the second additional data 431, a second marker 433 for the second additional data 431, and a second reference 432 may be incorporated into the current file.

For example, in FIG. 7, additional data and additional data management information for the additional data may be inserted or removed in a single set.

Referring to FIG. 8, even when a plurality of data items, for example, 520 and 530 are inserted into an image file, additional data management information, for example, 540, for the plurality of additional data 520 and 530 may exist at a certain position. For example, a compound file 500 includes an image area 510, and a plurality of additional data items, for example, 520 and 530 are sequentially positioned behind the image area 510. In addition, a tail of the compound file 500 may have one marker 540 and, whenever additional data is inserted, corresponding references, for example, Ref 1 and Ref 2 may be sequentially recorded in a file start direction around the marker 540.

The embodiment illustrated in FIG. 8 may have higher space availability compared to that illustrated in FIG. 7, but it may have a little higher complexity in search of a position at which a reference for corresponding data is to be recorded in insertion or deletion of the additional data.

According to an embodiment of the present disclosure, by positioning a marker representing a compound file in a tail of the compound file, namely, an End of File (EOF), there is an effect capable of rapidly confirming (e.g., through a single access to the tail) the compound file.

In addition, by recording the position of the additional data inserted into the compound file at a specific position around the marker (e.g., rightly ahead of the marker), the present disclosure also has an effect of rapid access to the additional data. Furthermore, regardless of a file size or a file type, a time to determine whether to be a compound file or an access time to the additional data is ensured to be constant.

Furthermore, since a header is not changed, insertion or deletion of additional data into or from a current compound file is easy and, accordingly, compatibility usability with other applications can be high.

A compound file according to an embodiment of the present disclosure may be stored in a data storage device or a data recording medium. The data storage device may be any data processing device (e.g., a computer, a mobile phone, and the like) capable of storing the compound file may be also included. In addition, the data recording medium may be that any type of data storage medium capable of storing the compound file may be included, where the data storage medium includes a hard disk, an optical disk, a Read Only Memory (ROM), a Random Access Memory (RAM), a flash memory, a Universal Serial Bus (USB) storage medium, and the like.

A compound file creating method according to an embodiment of the present disclosure can also be implemented in a form of an executable program command through a variety of computer means recordable to computer readable media. The computer readable recording medium is any data storage device that can store data which can be thereafter read by a computer system.

The program commands recorded to the media may be components specially designed for the present disclosure or may be usable to one of ordinary skill in the art.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Program commands include not only a machine language code made by a complier but also a high level code that can be used by an interpreter, and the like, which is executed by a computer.

The aforementioned hardware device can work as more than a software module to perform the action of the present disclosure and they can do the same in the opposite case.

The foregoing description of the present disclosure has been presented for the purposes of illustration and description. It is apparent to a person having ordinary skill in the art to which the present disclosure relates that the present disclosure can be easily modified into other detailed forms without changing the technical principle or essential features of the present disclosure.

Therefore, the foregoing embodiments should be regarded as illustrative rather than limiting in all aspects. In an example, each component which has been described as a unitary part can be implemented as distributed parts. Similarly, each component which has been described as distributed parts can also be implemented as a combined part.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for creating an image file in an electronic device, the method comprising:
   receiving an the image data and additional data; and
   creating a compound file by using the received image data and the additional data,
   wherein the compound file comprises:
      the image data,
      an image data header corresponding to the image data,
      the additional data, and
      additional data management information corresponding to the additional data, the additional data management information is separated from the image file header.

2. The method of claim 1, wherein the additional data management information comprises at least one of a marker indicating that the compound file is an image file having the additional data inserted therein, and at least one reference indicating a position of the additional data.

3. The method of claim 1, wherein a marker is recorded in a tail of the compound file.

4. The method of claim 2, wherein the at least one reference is recorded at a position adjacent to the marker.

5. The method of claim 2, further comprising:
   inserting second additional data into the compound file,
   wherein the compound file having the second additional data inserted therein further comprises a second marker and a second reference.

6. The method of claim 2, wherein the second additional data is positioned behind the marker or behind the additional data.

7. A non-transitory computer readable medium having a program recorded thereon, which, when executed by a computer, performs the method of claim 1.

8. The method of claim 1, wherein the additional data comprises at least one of a sound, a text, a link, and an executable file.

9. The method of claim 2, wherein the compound file comprises the additional data, the at least one reference, and the marker at respective positions in an arbitrary sequence.

10. An electronic device for storing an image file, the electronic device comprising:
   a storage device; and
   a processor configured to:
      receive an image data and additional data, and
      generate a compound file by using the received image data and the additional data,
   wherein the compound file comprises:
      the image data,
      an image data header corresponding to the image data,
      the additional data, and
      additional data management information corresponding to the additional data, the additional data management information is separated from the image file header.

11. The electronic device of claim 10, wherein the compound file further comprises:
   at least one of a marker indicating that the compound file is an image file having the additional data inserted therein, and
   at least one reference indicating a position of the additional data.

12. The electronic device of claim 11, wherein the compound file further comprises second additional data,
   wherein the compound file having the second additional data inserted therein further comprises a second marker and a second reference, and
   wherein the second additional data is positioned behind the marker or behind the additional data.

13. The electronic device of claim 11, wherein the marker is recorded in a tail of the compound file.

14. The electronic device of claim 10, wherein the additional data comprises at least one of a sound, a text, a link, and an executable file.

15. The electronic device of claim 11, wherein the additional data, the at least one reference, and the marker are recorded in the compound file at respective positions in an arbitrary sequence.

16. The electronic device of claim 11, wherein the at least one reference is recorded at a position adjacent to the marker.

* * * * *